US010512984B2

(12) United States Patent
Molina Mesa et al.

(10) Patent No.: US 10,512,984 B2
(45) Date of Patent: Dec. 24, 2019

(54) RESISTANCE WELDING DEVICE (71) Applicant: GESTAMP INGENIERIA EUROPA SUR, S.L., Santpedor (ES)

(72) Inventors: Ricardo Molina Mesa, Molins de Rei (ES); Ignacio Martin Gonzalez, Sant Pere de Ribes (ES)

(73) Assignee: GESTAMP INGENIERIA EUROPA SUR, S.L., Barcelona (ES)

( * ) Notice: Subject to any disclaimer, the term of this patent is extended or adjusted under 35 U.S.C. 154(b) by 600 days.

(21) Appl. No.: 14/405,611

(22) PCT Filed: May 16, 2013

(86) PCT No.: PCT/ES2013/070313
§ 371 (c)(1),
(2) Date: Dec. 4, 2014

(87) PCT Pub. No.: WO2013/182720
PCT Pub. Date: Dec. 12, 2013

(65) Prior Publication Data
US 2015/0165544 A1 Jun. 18, 2015

(30) Foreign Application Priority Data
Jun. 5, 2012 (EP) .................................. 12382229

(51) Int. Cl.
*B23K 11/31* (2006.01)
*B23K 11/00* (2006.01)
(52) U.S. Cl.
CPC ........ *B23K 11/315* (2013.01); *B23K 11/0053* (2013.01)
(58) Field of Classification Search
CPC ..................... B23K 11/315; B23K 11/0053
(Continued)

(56) References Cited

U.S. PATENT DOCUMENTS 4,500,769 A * 2/1985 Tincher ................ B23K 11/366
219/86.1
4,761,532 A * 8/1988 Bock .................. B23K 11/0033
219/66
(Continued)

FOREIGN PATENT DOCUMENTS

EP 1 579 943 A1 9/2005
JP 58-61976 A 4/1983
(Continued)

OTHER PUBLICATIONS

International Search Report of PCT/ES2013/070313, dated Oct. 14, 2013. [PCT/ISA/210].
European Search Report of EP 12 38 2229, dated Apr. 12, 2013.

*Primary Examiner* — Alexander M Valvis
(74) *Attorney, Agent, or Firm* — Sughrue Mion, PLLC (57) ABSTRACT

A resistance welding device, comprising a frame for supporting a tool configured like a clamp with two arms arranged facing one another and having respective welding electrodes, of which a first arm is integral to the clamp and the second arm is assembled with the capacity of being moved with respect to the clamp by means of a first actuator, such that respective movements along a straight trajectory can be imparted to the arms of the clamp for moving their electrodes closer to or away from one another. One of the arms has a hollow head housing the corresponding electrode in a guided manner the tip of which is suitable for receiving the support of a component to be welded on the workpiece, the head and the electrode being able to adopt at least one standby position (A) in which the electrode is inside the mentioned head; and a working position (B), in which the tip of the electrode is arranged in or exceeds the inlet of the head, accordingly placing the component to be welded outside the head.

7 Claims, 8 Drawing Sheets

(58) Field of Classification Search
 USPC .................................................. 219/86.33, 93
 See application file for complete search history.

(56) References Cited

U.S. PATENT DOCUMENTS

| | | | | |
|---|---|---|---|---|
| 4,789,768 | A * | 12/1988 | Tobita | B23K 11/0053 |
| | | | | 219/78.01 |
| 4,831,228 | A * | 5/1989 | Schumacher | B23K 11/31 |
| | | | | 219/86.22 |
| 5,063,278 | A * | 11/1991 | Konno | B23K 11/14 |
| | | | | 219/86.1 |
| 5,789,719 | A * | 8/1998 | Pary | B23K 11/317 |
| | | | | 219/86.25 |
| 5,831,234 | A * | 11/1998 | Nakamura | B23K 11/317 |
| | | | | 219/86.25 |
| 6,420,671 | B1 * | 7/2002 | Tsujimoto | B23K 11/11 |
| | | | | 219/79 |
| 7,633,032 | B2 * | 12/2009 | Wang | B23K 11/115 |
| | | | | 219/161 |
| 2002/0011470 | A1 * | 1/2002 | Domschot | B23K 9/296 |
| | | | | 219/86.8 |
| 2005/0284848 | A1 * | 12/2005 | Martin Gonzalez | |
| | | | | B23K 11/004 |
| | | | | 219/93 |
| 2008/0240895 | A1 * | 10/2008 | Aoyama | B07C 5/08 |
| | | | | 414/331.13 |
| 2010/0180711 | A1 * | 7/2010 | Kilibarda | B05B 15/0225 |
| | | | | 74/490.06 |
| 2010/0243615 | A1 * | 9/2010 | Angel | B23K 11/243 |
| | | | | 219/117.1 |

FOREIGN PATENT DOCUMENTS

| | | | | |
|---|---|---|---|---|
| JP | | 9-38780 A | 2/1997 | |
| JP | | 09038780 | * 2/1997 | ............ B23K 11/14 |

* cited by examiner

Fig. 7

RESISTANCE WELDING DEVICE

CROSS REFERENCE TO RELATED APPLICATIONS

This application is a National Stage of International Application No. PCT/ES2013/070313 filed May 16, 2013, claiming priority based on European Patent Application No. 12382229.8, filed Jun. 5, 2012, the contents of all of which are incorporated herein by reference in their entirety.

TECHNICAL FIELD OF THE INVENTION

The invention relates to a resistance welding device particularly suitable for welding small components or workpieces, such as welding nuts to a metal sheet arranged in any spatial orientation within the range of the device.

BACKGROUND OF THE INVENTION

Resistance welding devices comprising a tool configured like a clamp in which two arms supporting respective welding electrodes are distinguished are known today. Conventionally, one of the arms has the capacity of being moved with respect to the tool to enable holding between the arms the components or workpieces on which the welding operation must be performed by passing a welding current through the electrodes when the workpiece is held between the arms of the clamp.

When the welding operation requires attaching a small component, such as a nut on the surface of a metal sheet, in ideal situations in which said sheet is horizontally orientated the small component is placed on the sheet to attach them by welding. This small component is placed by means of shuttles or pistons immediately before the upper electrode exerts pressure on the lower electrode arranged under the sheet.

This approach is not applicable when the welding device incorporating the clamp is assembled on the articulated arm of a robot for the purpose of welding workpieces which can have a spatial orientation different from the horizontal, to one another. In these circumstances the small component does not rest naturally and stably on the sheet.

A first objective of the invention is therefore a device assuring the correct attachment by welding in any spatial orientation.

On the other hand, the small components to be welded must be supplied to the mentioned shuttles or pistons which, like the clamp, must have the same capacity for being orientated according to the needs of each welding operation.

Another objective of the invention is a device which in addition to assuring the correct welding, assures the correct supply of the small components to be welded by means of the clamp.

Another objective of the invention is that this supply is performed simply and such that a significant number of welding operations can be carried out consecutively without needing to intervene with the supply means.

Another objective of the invention is to disclose a device capable of offering the performance pointed out above and which is simple in construction and with an optimum number of components or mobile parts.

DISCLOSURE OF THE INVENTION

The device according to the invention is of the types comprising a frame for supporting a tool configured like a clamp with two arms arranged facing one another and having respective welding electrodes, of which a first arm is integral to the clamp and the second arm is assembled with the capacity of being moved with respect to the clamp by means of a first actuator, the clamp being able to be moved with respect to the frame supporting it by means of a second actuator and such that both first and second actuators have the capacity of being driven together for imparting respective movements along a straight trajectory to the arms of the clamp for moving their electrodes closer to or away from one another.

In essence, the device is characterised in that one of the arms has a hollow head defining an outer surface with an inlet and housing the corresponding electrode in a guided manner the tip of which is suitable for receiving the support of a component to be welded on the workpiece, the head and the electrode being able to adopt at least one standby position (A) with respect to one another, in which the electrode is inside the mentioned head, the tip of the electrode being arranged a sufficient distance with respect to the outer surface of the head to enable arranging the component to be welded to the workpiece between them and inside the head; and a working position (B), in which the tip of the electrode is arranged in or exceeds the inlet of the head, accordingly placing the component to be welded outside the head.

In a variant of special interest, the first arm fixed with respect to the clamp supports the hollow head the outer surface of which is intended for receiving the support of the workpiece, said head being subjected to the effect of elastic means which tend to arrange it in a standby position (A) in which the tip of the electrode and the component arranged immediately on it are inside hidden under the outer support surface, when pressure is being exerted on said outer support surface said head can move a sufficient distance in the direction opposite the second mobile arm so that the component resting on the electrode contacts the workpiece to be welded that is applied on the mentioned outer support surface through the inlet of the head.

According to another feature of this variant, the device comprises control means for controlling the second actuator and consequently the linear movement imparted to the clamp with respect to the frame, said control means comprising instructions for moving the clamp towards the workpiece while it is immobilised so that the component resting on the electrode contacts said workpiece through the inlet of the head when the outer support surface of the hollow head is retracted due to the forward movement of the clamp.

The invention contemplates that the mentioned control means also control the first actuator of the second arm of the clamp while the clamp moves forward for retracting the outer support surface of the hollow head, the control means comprising instructions for moving this second arm with respect to the clamp, together with its forward movement, and towards first arm for immobilising the workpiece.

The current devices comprise control units for controlling the mobile arm of the clamp and also for controlling the latter with respect to a frame for the purpose of substantially maintaining and exerting the same pressure with the electrodes on the workpieces to be welded during the welding operation.

Advantageously, the variant of the invention described above uses the same compensation systems, commonly called equalisers in the scope of welding devices comprising tools configured like clamps for arranging the electrode in its operating position. This allows, for example, eliminating active movement systems for moving the electrode with respect to the corresponding arm of the clamp considerably simplifying the construction of the device.

According to another feature, the electrode housed in the hollow head houses a centring bolt or pin for centring the component to be welded on the workpiece, the distal end of which protrudes beyond the tip of the electrode.

In another variant of the invention, the first actuator is a linear actuator and the second arm comprises a carriage which transports the hollow head, the carriage being linked to the first actuator by elastic means which tend to arrange it in an extended position with respect to the said first actuator, the second arm further comprising an end of travel stop for the carriage intended for preventing the movement of the head which it transports without the forward movement of the actuator being prevented.

Preferably, the electrode guided through the head directly receives the thrust of the same first actuator, such that a relative movement occurs between the hollow head and the guided electrode when, during the movement of the first actuator, the carriage reaches the end of travel stop and the forward movement of the first actuator is not stopped.

According to another aspect of the invention, the device is provided with a reservoir suitable for accumulating a line of components to be welded, integral to the clamp, and with means communicating said reservoir with the interior of the hollow head for transporting the components to be welded from the reservoir to a position juxtaposed to the tip of the electrode housed therein.

In one embodiment, said reservoir comprises an oblong housing and a hold-down element subjected to the action of a thruster tending to arrange it against the last component to be welded of the line of components housed in the reservoir, the hold-down element being assembled with the capacity of being moved with respect to the direction of the line of components inside the reservoir and such that it will always exert a thrust on the last component regardless of its position inside the reservoir.

The means communicating said reservoir with the interior of the hollow head preferably comprise a guide element connecting an outlet of the reservoir with a positioning mechanism for positioning components communicating with a side opening of the head in communication with the cavity of said head.

According to another feature of the invention, the hollow head comprises retaining means for retaining a component to be welded in a position juxtaposed to the tip of the electrode when it adopts its standby position (A), said retaining means being able to be actuated together with the first actuator for releasing the component to be welded when a relative movement occurs between the hollow head and the electrode in the direction arranging the electrode in its working position (B).

DETAILED DESCRIPTION OF THE INVENTION

The drawings which will be referred to below show two variants of a device 1 according to the invention. In both variants the depicted device 1 comprises a frame 2 serving as a support for a tool configured like a clamp 3. This frame 2 is intended to be assembled in a robotic arm provided with several degrees of freedom in order to enable locating and orientating the clamp 3 in any point in space within the reach of the robotic arm. In the scope of the invention the term welding gun is used for designating clamp-shaped tool of this type.

It is known that the clamp 3 comprises two arms 4 and 5 arranged facing one another and having respective resistance welding electrodes. In the drawings the clamp 3 has always been illustrated in a vertical position and such that both electrodes are vertically aligned for facilitating the understanding of the drawings. In the two depicted variants of the device 1, the first arm 4 is an arm integral to the clamp 3 which is bent and has the electrode which is arranged in a lower position; and the second arm 5 having the electrode which is arranged in an upper position, it is assembled with the capacity of being moved with respect to the clamp 3 by means of a first actuator 8. As will be described in detail below, the clamp 3 can be moved with respect to the frame 2 supporting it by means of a second actuator 9. It is also known that both first and second actuators 8 and 9 have the capacity of being driven together for imparting respective movements along a straight trajectory to the arms 4 and 5 of the clamp 3 for moving their electrodes closer to or away from one another, and at the same time moving them closer and/or away with respect to a fixed point in space, arranged between the electrodes, in which a workpiece on which the welding operation must be performed can be located. In the drawings in FIGS. 5 and 6a to 6d this workpiece is represented by the workpiece 21 in the form of a C-shaped sheet.

Unlike known clamps, the clamp 3 of the device 1 is designed for automatically placing and welding a single or a plurality of components 15 to the workpiece 21, formed in the example by nuts, regardless of the orientation in space of said clamp 3. For such purpose, one of the arms 4 or 5 has a hollow head 10 inside which the components 15 to be welded will be deposited, which components will be subsequently placed in its welding position in contact with the workpiece 21 by thrusting the electrode 13, this sequence being repeated in each welding operation.

In the variant of FIGS. 1, 2a, 2b, 3 and 4a to 4c, this hollow head 10 is assembled on the second arm 5 which can be moved with respect to the clamp 3; while in the variant of FIGS. 5 and 6a to 6d this hollow head 10 is assembled on the first arm 4 fixed with respect to the clamp 3.

Figure 1:
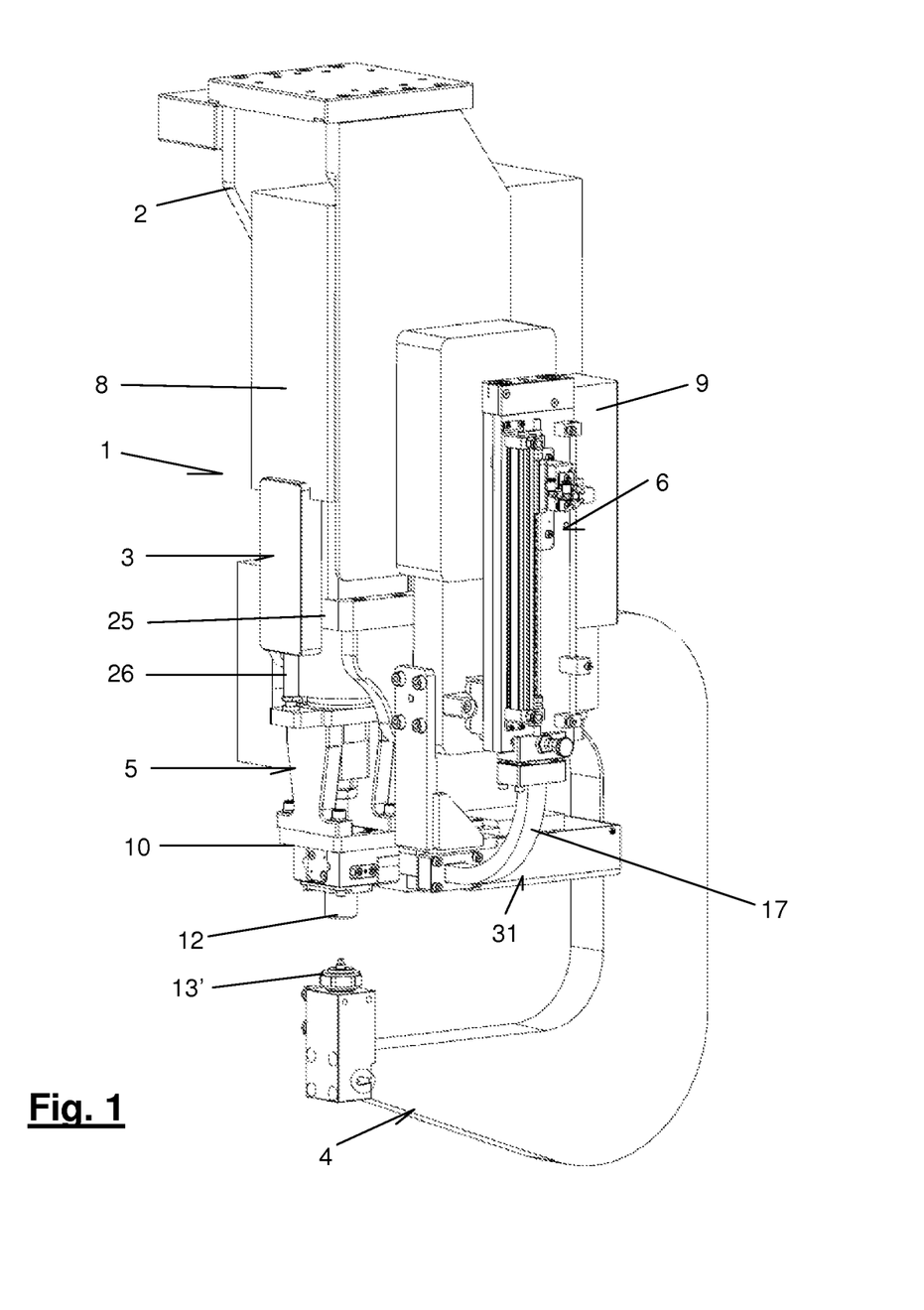
FIG. 1 is a perspective view of a device according to a first variant of the invention.

In order to feed and arrange the components to be welded 15 automatically in the suitable position so that they are moved by the electrode 13 towards the workpiece 12, it can be seen in FIG. 1 that the device 1 according to the first variant of the invention is provided with supply means comprising a reservoir 6 integral to the clamp 3 suitable for accumulating a line 28 of components 15 to be welded.

Figure 7:
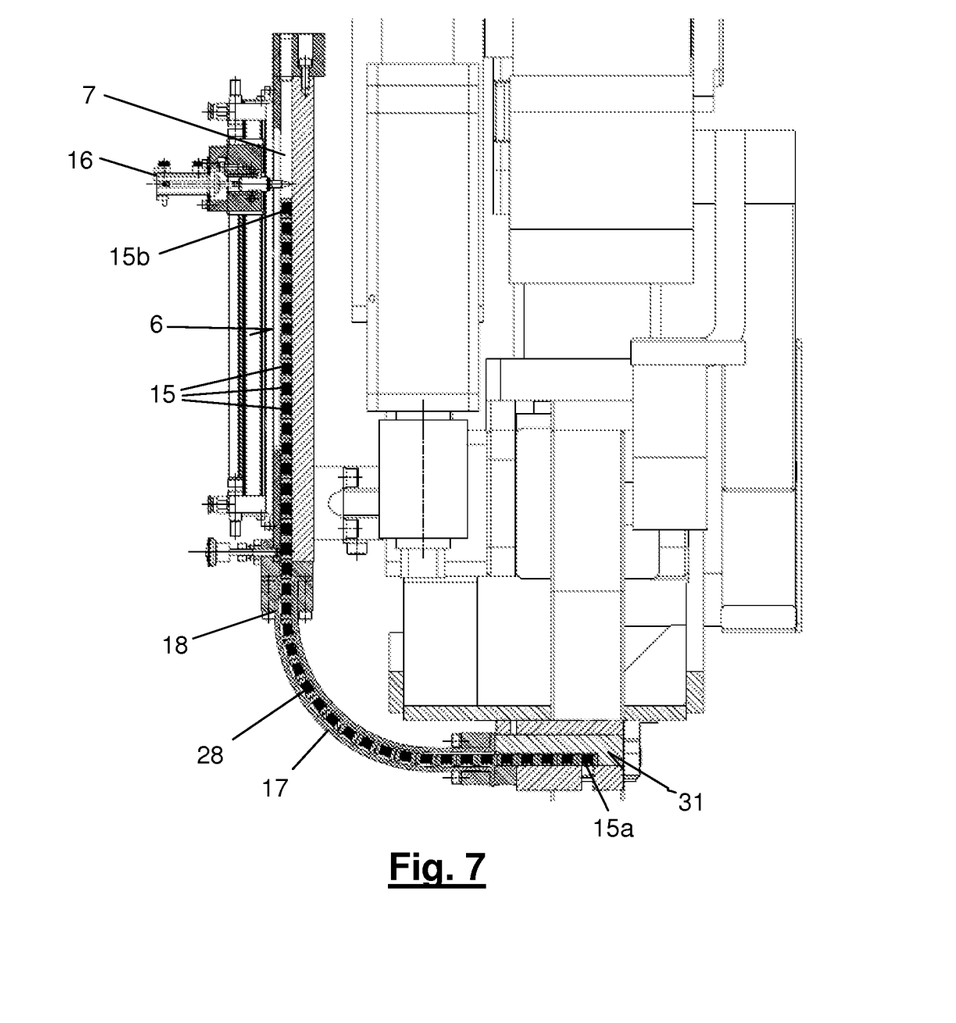
FIG. 7 is a partial and detailed cross-section view of the supply means for supplying the components to be welded in the device of FIG. 1.

FIG. 7 shows the cross-section of this part of the device 1 and specifically the reservoir 6 and the means connecting said reservoir 6 with a positioning mechanism 31 (shown in greater detail in FIGS. 2a and 2b) which will resend the components 15 to be welded into the head 10 one by one each time a welding operation must be performed.

The reservoir 6 comprises an oblong housing 7 and a hold-down element 16 which is subjected to the action of a thruster tending to arrange it against the last component 15b to be welded of the line 28 of components 15 housed in the reservoir 6. This hold-down element 16 which may be driven by elastic or pneumatic means is further assembled in the reservoir 6 with the capacity of being moved with respect to the direction of the line 28 of components inside the reservoir 6, such that it will always exert a thrust on the last component 15b regardless of its position inside the reservoir 6, a thrust which will be transmitted to the first component 15a of the line 28 for arranging it in a chamber 29, illustrated in detail in FIGS. 2a and 2b, of the positioning mechanism 31.

In the example of FIGS. 1 and 7, the means connecting the reservoir 6 with the interior of this positioning mechanism 31 comprise a guide element 17 extending between an outlet 18 of the reservoir 6 and a side opening not shown in the drawings of the aforementioned chamber 29. The invention contemplates using a conduit, hose or the like having inner section same as or complementary to the component 15 as guide element or, alternatively, a rail or an open guide structure, which does not completely envelop the components 15 but is suitable so that these can slide towards positioning mechanism 31 in a guided manner.

Figure 2A:
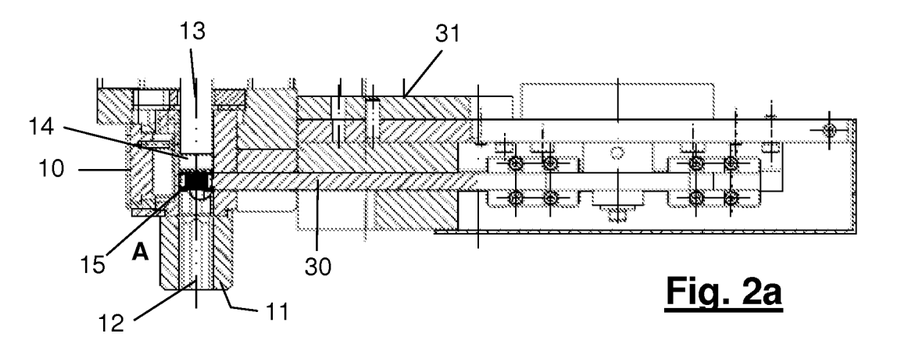
FIGS. 2a and 2b are respective cross-section and detailed views of the positioning mechanism of the device of FIG. 1 for positioning components to be welded according to two operating positions.
Figure 2B:
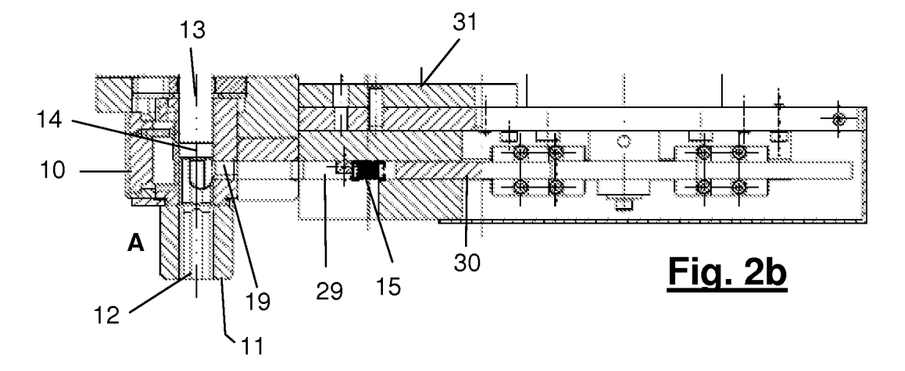

A piston 30 describing an alternating back and forth movement together with the electrode 13 has been arranged in a moveable manner in the chamber 29. FIG. 2a thus shows how the piston 30 adopts an extended position in which it arranges, by thrust, a component 15 to be welded in a position juxtaposed to the tip 14 of the electrode 13, while FIG. 2b shows the same piston 30 when it adopts a retracted position, allowing the entry of the first component 15b of the line 28 into the chamber 29, ready to be placed inside the head 10, juxtaposed to the tip 14 of the electrode 13 in the following movement manoeuvre of the piston 30 and when said electrode allows it, as will be explained below.

Figure 3:
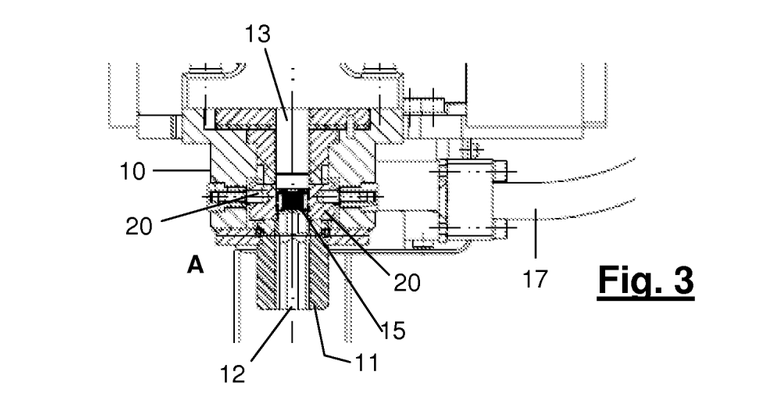
FIG. 3 is a cross-section and detailed view of the device of FIG. 1, specifically of its hollow head according to a plane normal to the cross-section plane of FIGS. 2a and 2b.
Figure 4A:
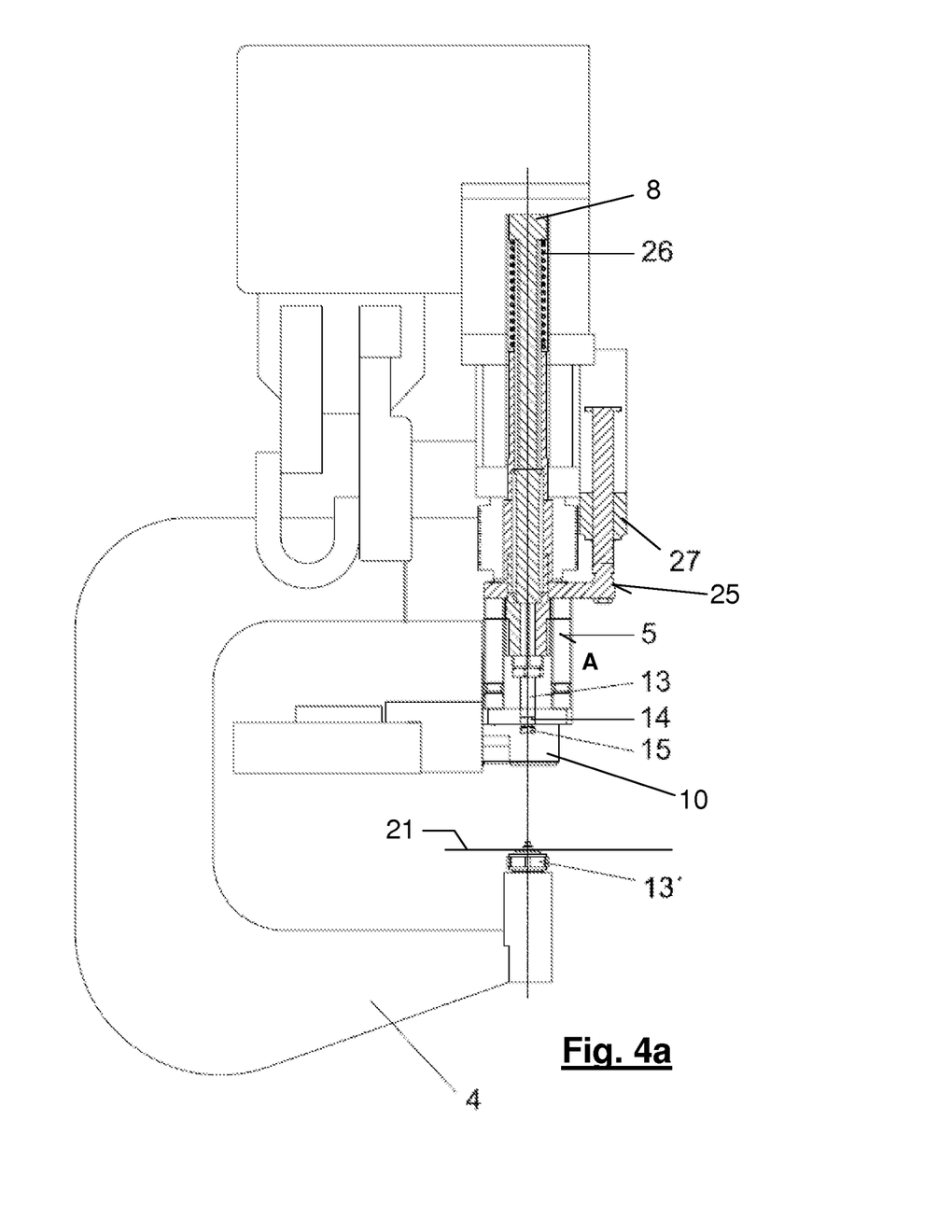
FIGS. 4a to 4c show three instants of a sequence of movements of the clamp of the device of FIG. 1 during a welding operation.
Figure 4B:
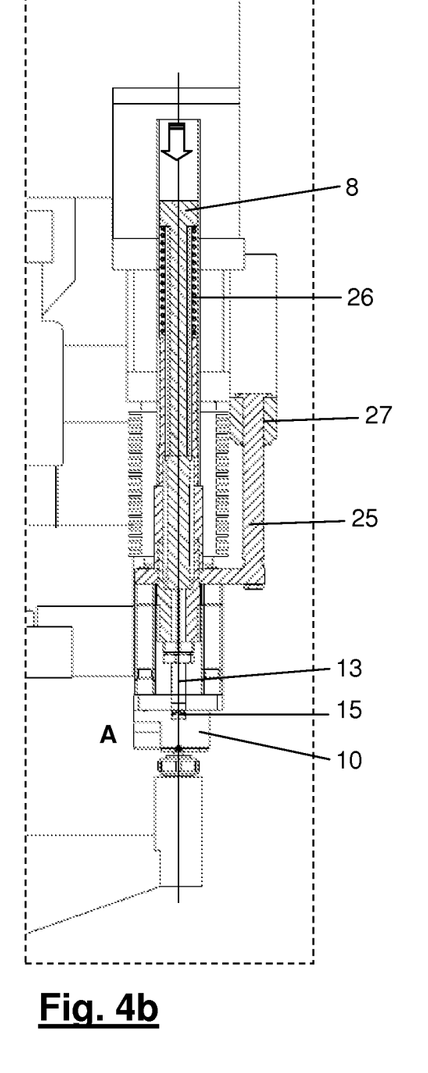
Figure 4C:
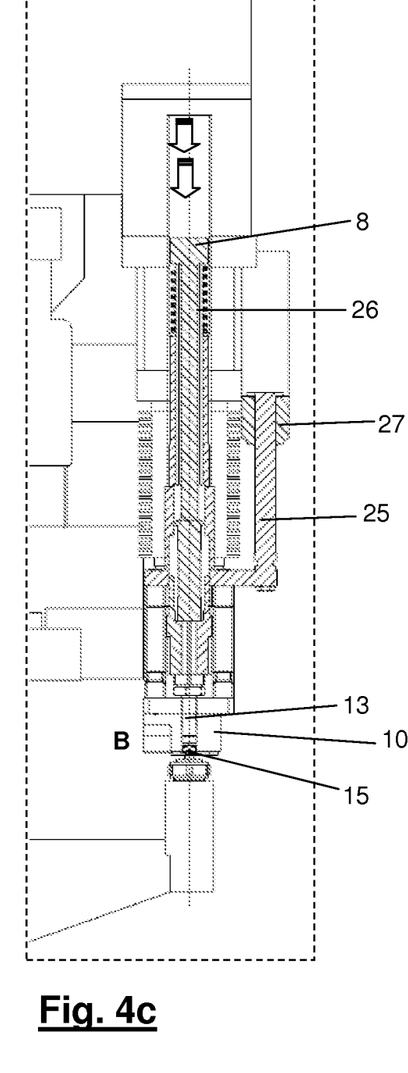

FIGS. 2a, 2b, 3 and 4a, but especially FIG. 3, show that the head 10 houses the electrode 13 in a guided manner the tip 14 of which is suitable for thrusting the component 15 to be welded on the workpiece 21 (see FIG. 4). The electrode 13 can be moved with respect to the head 10 such that it can adopt at least one standby position (A), depicted in FIGS. 2a, 2b and 3, in which the electrode 13 is inside the mentioned head 10, the tip 14 of the electrode 13 being arranged a sufficient distance with respect to the outer surface 11 of the head 10 to enable arranging the component 15 to be welded to the workpiece 21 between them; and a working position (B), depicted in FIG. 4c, in which the tip 14 of the electrode 13 is arranged in or exceeds the inlet 12 of the head 10, accordingly placing the component 15 to be welded outside the head 10.

The sequence of a welding operation is exemplified in FIGS. 4a to 4c.

Based on the situation depicted in FIG. 4a, having duly placed the clamp 3 such that the portion of the workpiece 21 on which the component 15 must be welded is arranged between the arms 4 and 5 of said clamp 3, resting on the electrode 13' of the lower arm 4 and preferably traversed by a centring bolt or pin 24 provided in the mentioned electrode 13' for such purpose, in a first step the first actuator 8 works to move the second arm 5 towards the workpiece 21, in this case downwards, the head 10 and the electrode 13 being moved together in unison until reaching the position depicted in FIG. 4b.

Subsequently, and due to the effect of the same first actuator 8, the movement of the head 10 is stopped but not that of the electrode 13, which starts a relative movement with respect to the head 10, being moved downwards driving the component 15 along until adopting the aforementioned working position (B), all this is as depicted in FIG. 4c.

It must be noted that to keep the component 15 inside the hollow head 10 without the risk of accidentally dropping it, the head 10 is provided with retaining means 20 for retaining the component 15 to be welded in the position juxtaposed to the tip 14 of the electrode 13 when it adopts its standby position (A), said retaining means being able to be actuated together with the first actuator 8 for releasing the component 15 to be welded when a relative movement occurs between the hollow head 10 and the electrode 13 in the direction arranging the electrode 13 in its working position (B). In the example these retaining means 20 are formed by a pair of clips which can be actuated in transverse direction with respect to the direction of the electrode 13 inside the head 10 and are illustrated in FIG. 3.

It should be noted that a single actuator, in this case the first actuator 8, is used for performing the movement in steps described above. To that end, the second arm 5 comprises a carriage 25 which transports the hollow head 10, the carriage being linked with the actuator 8 by elastic means 26 which work by traction and which tend to arrange the carriage in an extended position with respect to the mentioned actuator 8, as illustrated in FIG. 4b. In contrast, the electrode 13 guided through the head 10 is moved integral to the actuator 8.

The downward movement of the actuator 8 in the direction indicated by the arrow of FIG. 4b will cause the simultaneous movement of the carriage 25 and consequently of the head 10 and of the electrode 13. When the carriage 25 reaches an end of travel stop 27, preferably an adjustable stop, provided in the clamp 3, the forward movement of the carriage 25 and of the head 10 will be prevented although the movement of the actuator 8 continues, the elastic means 26 being compressed as illustrated in FIG. 4c, the actuator driving the electrode 13 along in its downward movement and causing the relative movement between the electrode 13 and the head 10 from that instant.

Figure 5:
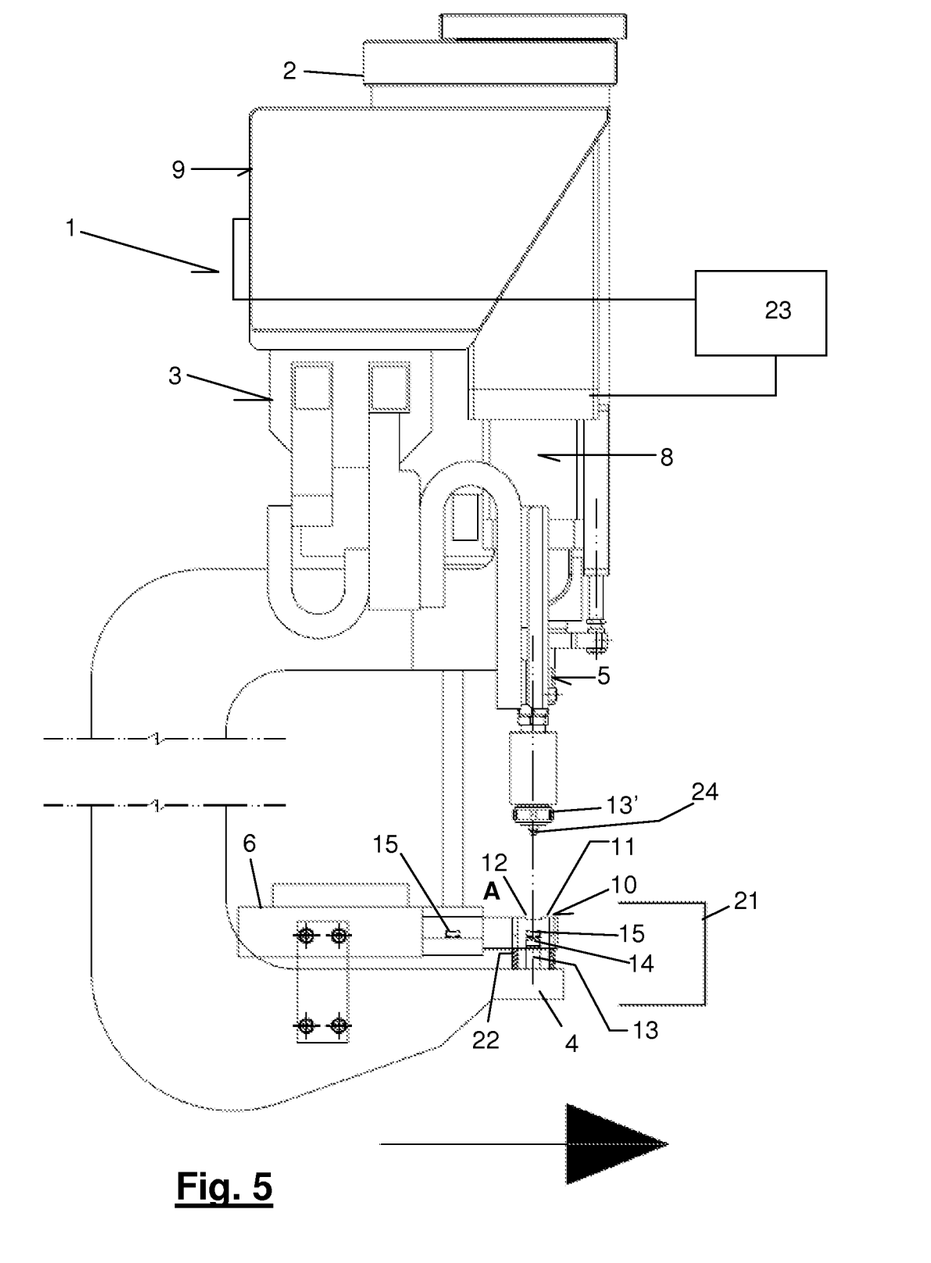
FIG. 5 shows a schematic view of a device according to another variant of the invention.

FIG. 5 schematically shows another variant of particular interest for a device 1 according to the invention.

Unlike the first variant, the first arm 4 which supports the hollow head 10 housing the electrode 13 is fixed with respect to the clamp 3.

In this case, the head 10 is subjected to the effect of elastic means 22 which tend to arrange it in a standby position (A), illustrated in FIG. 5, in which the tip 14 of the electrode 13 and the component 15 arranged immediately above it are inside hidden under the outer support surface 11 for the workpiece 21. As will be shown below, when pressure is being exerted on said outer support surface 11 the head 10 can move a sufficient distance in the direction opposite the second arm 5 so that the component 15 resting on the electrode 13 projects outwards through the inlet 12 of the head 10.

Figure 6A:
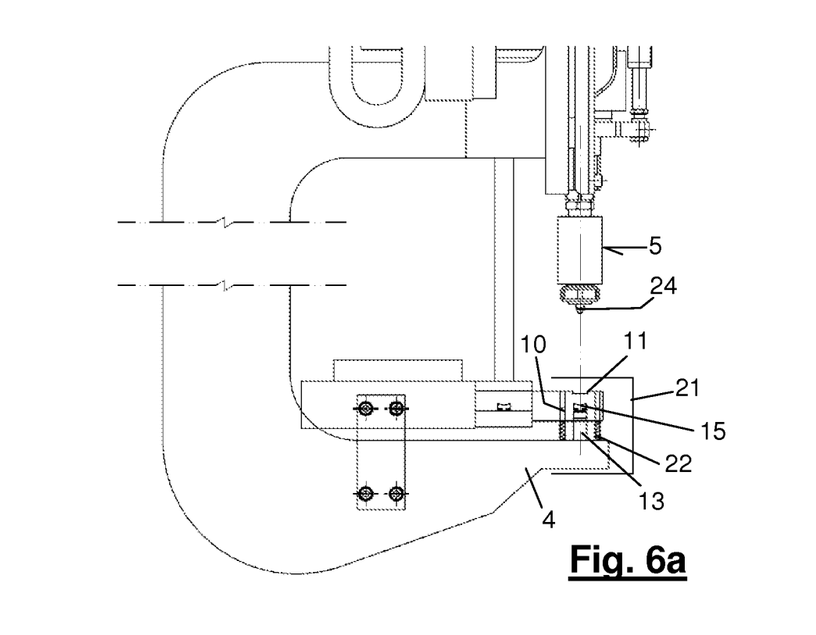
FIGS. 6a to 6d show four instants of a sequence of movements of the clamp of the device of FIG. 5 during a welding operation.
Figure 6B:
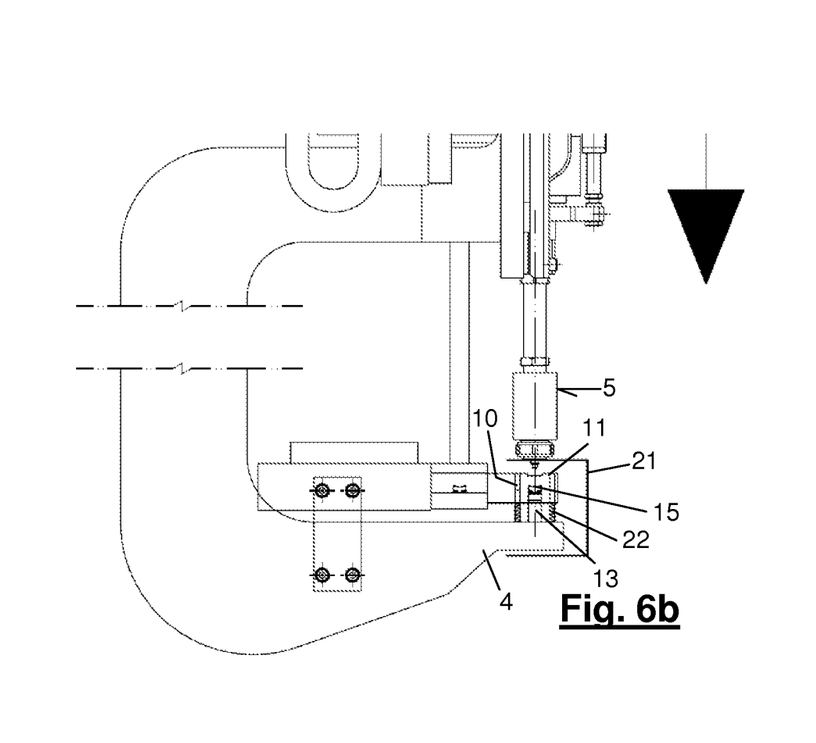
Figure 6C:
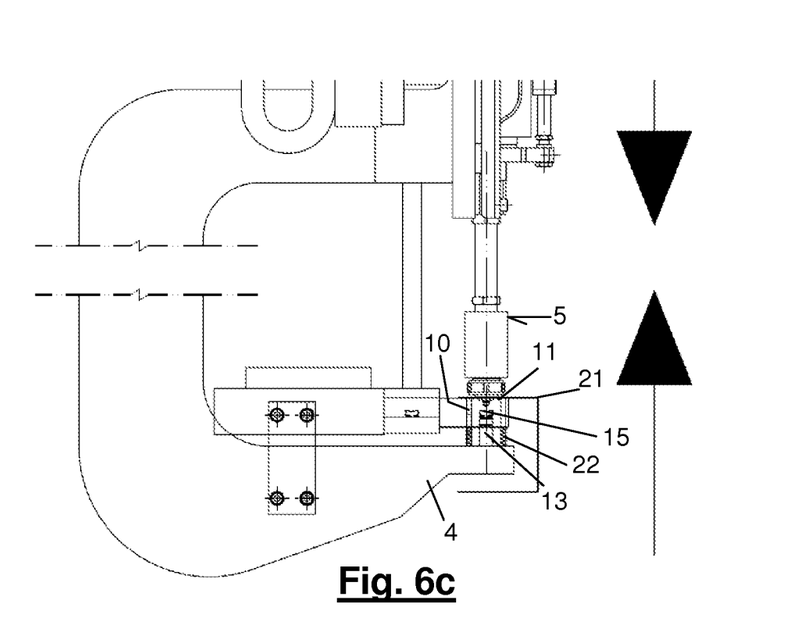

The sequence of movements during a welding operation is shown in FIGS. 6a to 6d. Based on the situation depicted in FIG. 5, in a first step the robotic arm moves the device 1 arranging the first and second arms 4 and 5 of the clamp 3 on either side of the workpiece 21, as illustrated in FIG. 6a; next, the first actuator 8 moves the second arm 5 in the direction indicated by the arrow until placing the electrode 13' on a first surface of the workpiece 21, as illustrated in FIG. 6b; then the second actuator 9 is driven for moving the assembly of the clamp 3 with respect to the frame 2 in the direction indicated by the upward arrow of FIG. 6c until the outer surface 11 of the head 10 rests on the opposite surface of the workpiece 21. Since the second arm 5 is moved together with the clamp 3, this last manoeuvre does require driving the first actuator 8 for moving the second arm 5 downwards, as indicated by the downward arrow of the same FIG. 6c, for compensating the upward movement of the clamp 3.

Figure 6D:
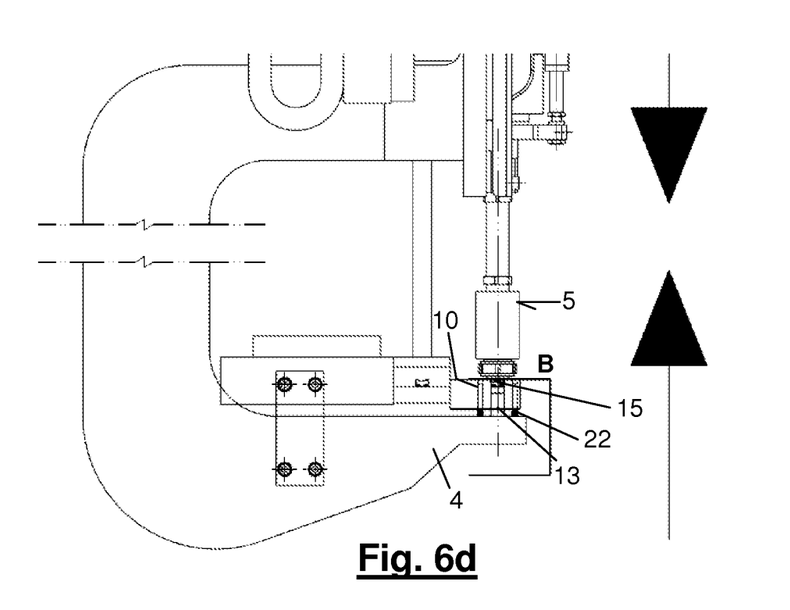

The following step is carried out in a manner similar to the previous step for moving the clamp 3 and thereby the head 10 upwards but, the movement of the workpiece 21 being prevented due to the intervention of the first actuator 8 on the second arm 5, the retraction of the outer support surface 11 of the head 10 now occurs until the component 15 contacts the facing surface of the workpiece 21, an instant in which the electrode 13 adopts the working position (B) with respect to the head 10 and said welding can be started since both electrodes 13 and 13' are in contact with the component 15 and the workpiece 21, respectively, as illustrated in FIG. 6d.

In order to coordinate the movement of the clamp 3 with respect to the frame 2 and at the same time that of the second arm 5 with respect to the clamp 3, the device 1 comprises control means 23 for controlling the second actuator 9 and consequently the linear movement imparted to the clamp 3 with respect to the frame 2, said control means 23 comprising instructions for moving the clamp 3 towards the workpiece 21 while it is immobilised. The mentioned control means 23 also control the first actuator 8 of the second arm 5 of the clamp 3 while the clamp moves forward 3 for retracting the outer support surface 11 of the head 10, therefore these control means 23 also comprise instructions for moving this second arm 5 with respect to the clamp 3, together with its forward movement, and towards the first arm 4 for immobilising the workpiece 21.

This variant of the invention offer certain advantages with respect to the first variant, since it constructively simplifies the second arm 5 and uses the resources which some welding devices with clamps already have so that they perform the function of the second actuator 9. More specifically, this function can be performed by the conventional equaliser systems which are conventionally used for moving the clamp during the maneuvers to move the workpiece to be welded closer.

On the other hand, it can be seen that the reservoir 6 for the line of components 15 is assembled integral to the first arm 4 of the clamp 3 which means that it travels together with the electrode 13, which in this second variant is fixed with respect to the first arm 4. There is therefore no relative movement between the reservoir 6 and the electrode 13.

According to another advantage of this variant of the device, there is no active mechanism operating directly on the electrode 13 housed in the hollow head 10, but the means moving the clamp 3 are utilised for arranging the electrode 13 in its working position (B).

Regarding the features of the reservoir 6, it is understood that it can be similar to that of the device of FIG. 1.

Although it is not discussed in greater detail, in this second variant the head 10 is also provided with retaining means 20 for retaining the component 15 to be welded in the position juxtaposed to the tip 14 of the electrode 13 when it adopts its standby position (A), said retaining means being able to be actuated together with the position the outer surface 11 of the head 10 adopts at all times, the component 15 which they hold being released when the said welding operation starts, i.e., when the component 15 is applied by pressure on a surface of the workpiece 21.

Similarly to the device of FIG. 1, these retaining means 20 can be formed by a pair of clips which can be actuated in transverse direction with respect to the axial direction of the electrode 13 inside the head 10.

Although not depicted, it is also contemplated that the electrode 13 housed in the hollow head 10 houses the centring bolt or pin 24 for centring the component 15 to be welded on the workpiece 21 instead of said bolt being arranged in the electrode 13' such as the case of the example of FIGS. 5 and 6a to 6d. Naturally, the length of the bolt 24 must be such that its distal end protrudes beyond the tip 14 of the electrode 13.

The invention claimed is:

1. A resistance welding device for welding a small component on a larger workpiece in the form of a metal sheet structure, comprising a frame for supporting a tool configured as a clamp with two arms, a first arm and a second arm, arranged facing one another and having respective welding electrodes, of which the first arm is integral to the clamp and the second arm is assembled with a capacity of being moved with respect to the first arm by a first actuator, the clamp being able to be moved with respect to the supporting frame by a second actuator and such that both the first and second actuators have a capacity of being driven together for imparting respective movements along a straight trajectory to the first and second arms of the clamp for moving the respective electrodes closer to or away from one another, wherein the first arm is fixed with respect to the clamp and has a hollow head defining an outer surface, configured for receiving a support of the workpiece, with an inlet and housing the corresponding one of the electrodes, a tip of the corresponding one of the electrodes which is suitable for receiving a support of a component to be welded on the workpiece, the hollow head and the corresponding electrode being able to adopt at least one standby position (A), in which the electrode is inside the hollow head, the tip of the electrode being arranged at a distance with respect to the outer surface of the hollow head to enable arranging the component therebetween inside the hollow head; and a working position (B), in which the tip of the electrode is arranged in or exceeds the inlet of the hollow head, accordingly placing the component to be welded outside the hollow head;

wherein the hollow head is elastically biased towards the standby position (A) in which the tip of the electrode and the component arranged immediately on the electrode are inside and hidden under the outer surface, and when pressure is exerted on the outer surface the hollow head moves a distance in a direction opposite the second arm so that the component resting on the electrode contacts the workpiece to be welded that is applied on the outer surface through the inlet of the hollow head; wherein the device comprises a controller comprising instructions that control the second actuator and consequently the linear movement imparted to the clamp with respect to the frame, the controller instructions control movement of the clamp towards the workpiece while immobilised so that the component resting on the electrode contacts the workpiece through the inlet of the hollow head when the outer surface of the hollow head is retracted due to the forward movement of the clamp; and wherein the controller instructions also control the first actuator of the second arm of the clamp while the clamp moves forward for retracting the outer surface of the hollow head, the controller instructions further control movement of the second arm with respect to the clamp, together with the forward movement of the clamp, and towards the first arm for immobilising the workpiece.

2. The device according to claim 1, wherein the electrode housed in the hollow head houses a centring bolt or pin for centering the component to be welded on the workpiece, the distal end of which protrudes beyond the tip of the electrode.

3. The device according to claim 1, wherein the electrode is configured to be guided through the hollow head.

4. The device according to claim 1, provided with a reservoir suitable for accumulating a line of components to be welded, integral to the clamp, and with means for communicating said reservoir with the interior of the hollow head for transporting the components to be welded from the reservoir to a position juxtaposed to the tip of the electrode housed therein.

5. The device according to claim 4, wherein said reservoir comprises an oblong housing and a hold-down element comprising a protruding member, the hold-down element subjected to the action of a thruster placing the protruding member against the last component to be welded of the line of components housed in the reservoir, the hold-down element being assembled with the capacity of being moved with respect to the direction of the line of components inside the reservoir and such that the hold-down element will always exert a thrust on the last component regardless of position inside the reservoir.

6. The device according to claim 4, wherein the means for communicating said reservoir with the interior of the hollow head comprise a guide element connecting an outlet of the reservoir with a positioning mechanism for positioning components communicating with a side opening of the head in communication with the cavity of said head.

7. The device according to claim 1, wherein the hollow head comprises retaining means for retaining a component to be welded in a position juxtaposed to the tip of the electrode when adopting the standby position (A), said retaining means being able to be actuated together with the first actuator for releasing the component to be welded when a relative movement occurs between the hollow head and the electrode in the direction arranging the electrode in the working position (B).

* * * * *